United States Patent
Strassner et al.

(10) Patent No.: US 10,331,679 B2
(45) Date of Patent: Jun. 25, 2019

(54) METHOD AND APPARATUS FOR PROVIDING A RECOMMENDATION FOR LEARNING ABOUT AN INTEREST OF A USER

(71) Applicant: AT&T Intellectual Property I, L.P., Atlanta, GA (US)

(72) Inventors: Bryan Strassner, Union, MO (US); Allen Brown, Imperial, MO (US); Michael Lemen, Ofallon, MO (US); Trevor Lovett, Amol, MO (US); Douglas McCullough, St. Charles, MO (US); Matthew McEuen, Bridgeton, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 411 days.

(21) Appl. No.: 14/928,861

(22) Filed: Oct. 30, 2015

(65) Prior Publication Data

US 2017/0124080 A1  May 4, 2017

(51) Int. Cl.
  *G06F 16/00* (2019.01)
  *G06F 16/2457* (2019.01)
  *G06F 16/248* (2019.01)
  *G06F 16/28* (2019.01)
  *G06F 16/9535* (2019.01)

(52) U.S. Cl.
  CPC ...... *G06F 16/24578* (2019.01); *G06F 16/248* (2019.01); *G06F 16/285* (2019.01); *G06F 16/9535* (2019.01)

(58) Field of Classification Search
  None
  See application file for complete search history.

(56) References Cited

U.S. PATENT DOCUMENTS

| | | | |
|---|---|---|---|
| 6,078,916 A | 6/2000 | Culliss | |
| 7,031,961 B2* | 4/2006 | Pitkow | G06F 17/30884 |
| 7,716,198 B2 | 5/2010 | Meyerzon et al. | |
| 7,974,971 B2 | 7/2011 | Lu et al. | |
| 7,974,989 B2 | 7/2011 | Aranowich et al. | |
| 8,374,985 B1 | 2/2013 | Das et al. | |
| 8,458,192 B1 | 6/2013 | Procopio | |
| 8,595,207 B2 | 11/2013 | McFarlane et al. | |

(Continued)

OTHER PUBLICATIONS

Jones, Rosie, "Generating Query Substitutions". 2006. pp. 1-10.

*Primary Examiner* — Bai D Vu

(57) ABSTRACT

A method and apparatus for providing a recommendation for learning about an interest are disclosed. For example, the method receives a query for a recommendation for one or more articles for learning about an interest, determines whether the interest of the user is in a list of interests, wherein each particular interest is an interest for which a database contains at least one article for learning about the particular interest, wherein the database is used for storing for each particular article: the particular article and a normalized relationship score for the interest, retrieves from the database, one or more articles having the normalized relationship score related to the interest when the interest is in the list of interests, and presents the recommendation to an endpoint device of the user, wherein the recommendation comprises the one or more articles related to the interest that are retrieved.

20 Claims, 9 Drawing Sheets

(56) References Cited

U.S. PATENT DOCUMENTS

| | | | |
|---|---|---|---|
| 8,667,013 B1 | 3/2014 | Lawrence et al. | |
| 8,838,589 B1 | 9/2014 | Tam | |
| 8,972,394 B1 | 3/2015 | Tong et al. | |
| 9,129,227 B1* | 9/2015 | Yee | G06N 99/005 |
| 9,177,044 B2 | 11/2015 | Franks et al. | |
| 2006/0287980 A1 | 12/2006 | Liu et al. | |
| 2008/0154886 A1 | 6/2008 | Podowski et al. | |
| 2008/0209339 A1* | 8/2008 | Macadaan | G06F 3/0482 715/745 |
| 2011/0295612 A1* | 12/2011 | Donneau-Golencer | G06Q 30/02 705/1.1 |
| 2012/0198487 A1* | 8/2012 | Suzuki | G06F 17/30038 725/13 |
| 2013/0179802 A1* | 7/2013 | Martinazzi | H04L 67/22 715/753 |
| 2013/0204833 A1* | 8/2013 | Pang | G06F 17/30699 706/52 |
| 2013/0311409 A1* | 11/2013 | Ye | G06N 99/005 706/12 |
| 2014/0032468 A1* | 1/2014 | Anandaraj | G06Q 30/02 706/46 |
| 2015/0066959 A1* | 3/2015 | Yi | G06F 17/30867 707/751 |
| 2015/0206452 A1* | 7/2015 | Davidson | G09B 19/18 434/107 |
| 2015/0262069 A1* | 9/2015 | Gabriel | G06F 17/30867 706/48 |
| 2015/0317317 A1 | 11/2015 | Deng et al. | |
| 2016/0070731 A1* | 3/2016 | Chang | G06Q 30/00 707/741 |
| 2016/0203221 A1* | 7/2016 | Rao | G06F 17/30864 707/707 |

* cited by examiner

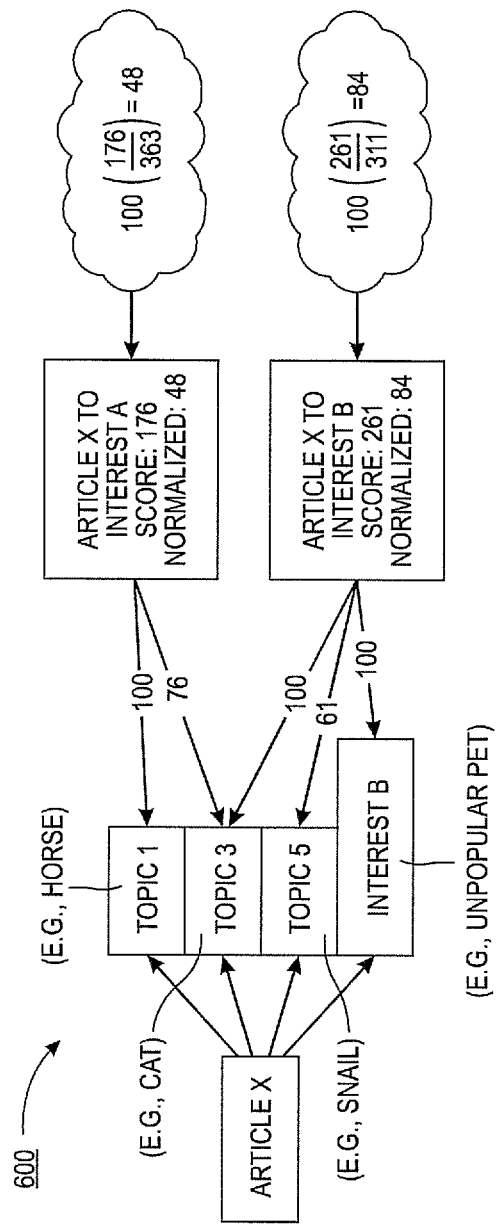

METHOD AND APPARATUS FOR PROVIDING A RECOMMENDATION FOR LEARNING ABOUT AN INTEREST OF A USER

The present disclosure relates to a method and apparatus for providing a recommendation for learning about an interest of a user via a network, e.g., a network of a service provider.

BACKGROUND

A user may wish to learn about a topic of interest. The user may query a search engine for content by entering a term. However, search engines may respond with content relevant for commerce. As such, the content delivered in the response to the query may provide little or no information useable for learning purposes.

SUMMARY OF THE DISCLOSURE

In one embodiment, the present disclosure describes a method and apparatus for providing a recommendation for learning about an interest via a network of a service provider. For example, the method implemented via a processor receives a query from a user, wherein the query is for a recommendation for one or more articles for learning about an interest, determines whether the interest of the user is in a list of interests, wherein each particular interest in the list of interests is an interest for which a database of articles contains at least one article for learning about the particular interest, wherein the database of articles is a database used for storing for each particular article of the one or more articles in the database: the particular article and a normalized relationship score for the interest, retrieves from the database of articles, one or more articles having the normalized relationship score related to the interest when the interest is in the list of interests, and presents the recommendation to an endpoint device of the user, wherein the recommendation comprises the one or more articles related to the interest that are retrieved.

BRIEF DESCRIPTION OF THE DRAWINGS

The teaching of the present disclosure can be readily understood by considering the following detailed description in conjunction with the accompanying drawings, in which:

FIG. 6 illustrates an example normalized article to interest relationship score;

To facilitate understanding, identical reference numerals have been used, where possible, to designate identical elements that are common to the figures.

DETAILED DESCRIPTION

When a network service provider (e.g., a cellular network service provider) wishes to provide content for a learning application, the service provider may enable the users to reach a popular search engine via its network. For example, the user may use popular search engines, e.g., Google®, Yahoo®, Bing®, etc. However, most search engines provide results based on the user's previous activities. As such, the search engines tend to show only information consistent with previous visits, thereby limiting access to complementary and contrary information. In addition, most search engines use a ranking of content that is commerce centric. For example, if a user wishes to learn about making a vase, then a query on a vase would likely retrieve content for purchasing of a vase instead, where most of the presented content would likely be from advertisers. In addition, the order in which the content is presented is based on placement advertisements and popularity rather than usefulness for a learning application. As such, a user wishing to learn about the process of making the vase would not be able to get useful information from such searches. Thus, the user would benefit by being able to obtain content that is specifically provided for a learning application.

The present disclosure broadly describes a method, a computer-readable storage device, and an apparatus for providing a recommendation (e.g., articles) for learning about an interest of a user.

Figure 1:
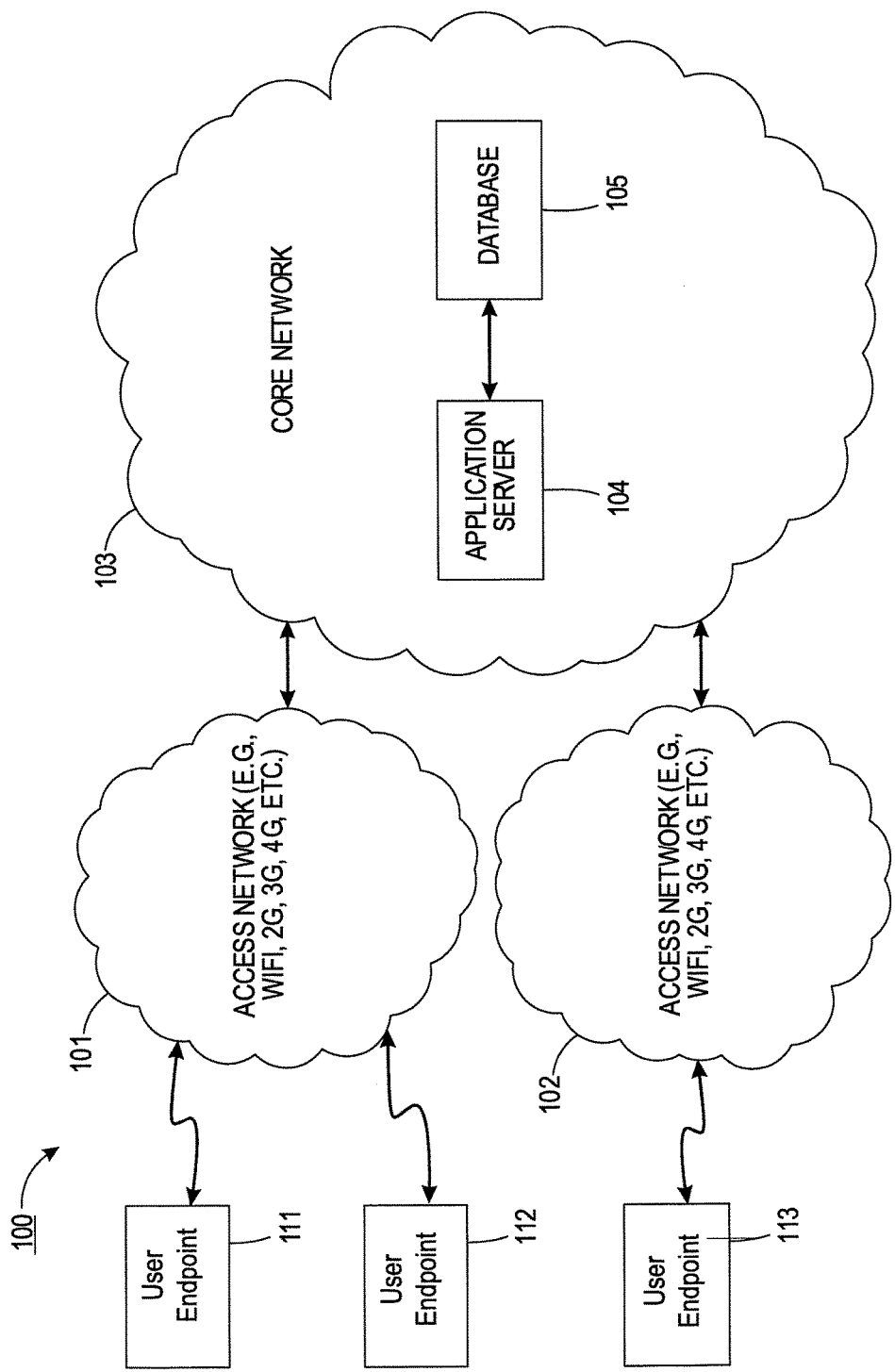
FIG. 1 illustrates an example network related to the present disclosure.

FIG. 1 illustrates an example network 100 related to the present disclosure. In one illustrative embodiment, the network 100 comprises User Endpoint (UE) devices 111-113, access networks 101-102, and a core network 103. Users of UE devices 111-113 may access services from the core network 103 via an access network 101 or 102.

The access networks 101-102 may comprise a Wireless-Fidelity (Wi-Fi) network, a cellular network (e.g., 2G, 3G, and the like), a long term evolution (LTE) network, and the like. The core network 103 may comprise any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 8:
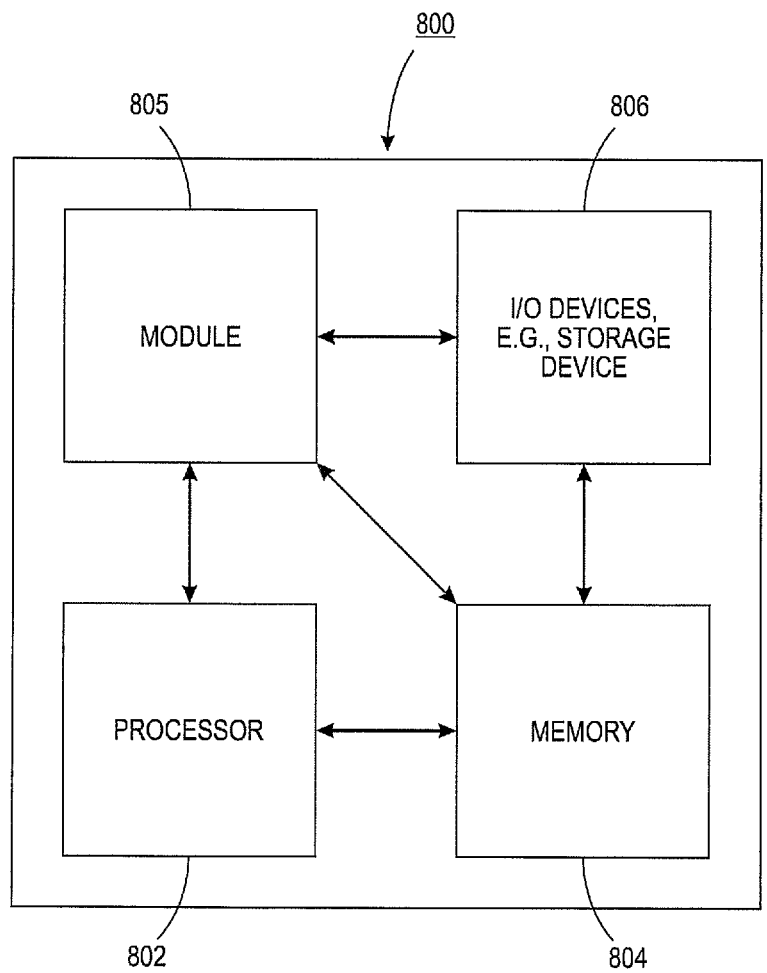
FIG. 8 depicts a high-level block diagram of a computer suitable for use in performing the functions described herein.

In one embodiment, the core network 103 may include an application server (AS) 104, and a database 105. For example, the AS 104 may be deployed as a hardware device embodied as a dedicated database server (e.g., the dedicated computer 800 as illustrated in FIG. 8). In one embodiment, the AS 104 is configured to perform the methods and functions described herein (e.g., the method 700 discussed below).

It should be noted that the network 100 may include additional networks and/or elements that are not shown to simplify FIG. 1. For example, the access network and the core network of FIG. 1 may include additional network elements (not shown), such as for example, base stations, border elements, gateways, firewalls, routers, switches, call control elements, various application servers, and the like.

In one embodiment, the database 105 is used for storing various data, e.g., terms, relationship scores, extracted articles, article to interest scores, conditions for goodness factors, normalized relationship scores, normalized article to interest scores, goodness factors for articles in relation to any number of interests, etc. Although a single database is shown, the various types of data may be stored in any number of databases. For instance, various databases, e.g., a term relationship database, a resolved terms database, an intermediate database, an extracted articles database, a master article database, and a database of articles, may be used. The various databases are described below.

In one embodiment, the AS 104 is used for presenting, to a user, one or more articles related to an interest of the user, when the application server receives a query from the user. The query of the present disclosure is for receiving a recommendation for one or more articles for learning related to an interest of the user. The AS 104 may also be used to enable the user to perform one or more desired actions that comprise providing feedback, joining a study group, or recommending another article to be included in the database 105 for learning associated with the interest of the user. For example, the user may select a topic of interest, send a query to the service provider with the topic of interest, receive articles relevant to the topic of interest, and learn from the articles that are received.

In order to be able to provide content, in one embodiment, the method of the present disclosure aggregates content appropriate for learning, e.g., articles from various sources (e.g., the general Internet and/or other systems). The method then ranks, indexes and stores the articles, such as the articles may be presented as a recommendation when a query is received from a user. The ranking of the present disclosure is performed based on relevance for learning about the interest of the user.

In order to clearly illustrate the teachings of the current disclosure, the following terminologies will first be described:
  Interest;
  Term;
  Topic;
  Term discovery process;
  Term relationship database;
  Relationship score;
  Normalized relationship score;
  Sentinel relationship score;
  Resolved term;
  Resolved terms database;
  Seeded term;
  Inclusion term;
  Exclusion term;
  Equivalent term;
  Intermediate database;
  Article;
  Article discovery process;
  Search helper term;
  Search term;
  Learning information source;
  Extracted article;
  Extracted articles database;
  Article to interest score;
  Normalized article to interest score;
  Master article database;
  Goodness factor; and
  Database of articles.

An interest refers to a subject of curiosity at a highest level of categorization. The subject of curiosity may be expressed using one or more terms. A term refers to a word or a set of words that represent an interest or a topic. A topic refers to a term related to one or more interests, i.e., one or more subjects of curiosity. For a non-limiting example, suppose a first interest is "animal" and a second interest is "pet." The topic may include "cat," "dog," and "crocodile." Then, the topics "cat" and "dog" may be related to both the first and the second interests, while the topic "crocodile" is related only to the first interest of "animal," assuming crocodiles are not generally kept as pets. The terms of the interests and the topics would collectively include "animal," "pet," "cat," "dog," and "crocodile."

A term discovery process refers to a process that identifies terms, and relationships between one or more terms and/or one or more interests.

A term relationship database comprises a database that stores terms (e.g., relating to interests and topics), and relationships between topics and interests. In one example, the term relationship database is accessible via an external Application Program Interface (API). The term relationship database may be an open access database that may be reached via the Internet. If the term relationship database is an open access database, it may be search by registering and accepting terms on a number of accesses in a given time interval. For example, a given number of times per day, per week, per month, etc. In one embodiment, the term relationship database may comprise any number of commercially available databases.

A relationship score refers to a score for quantifying a strength of relationship between an interest and a topic. The relationship score may be provided as a raw numerical number based on frequency of co-occurrences of the interest and the topic. For example, if the interest is history and the topic is $19^{th}$ century history, a raw numerical number may be assigned to the relationship score between "history" and "$19^{th}$ century" based on the frequency of times the terms "history" and "$19^{th}$ century" occur simultaneously. The relationship score that is based on the frequency is included in a response to a query sent to the term relationship database. For example, if the term relationship database receives a query for "history," the term relationship database may return several related terms with their respective relationship scores, e.g., $19^{th}$ century with a relationship score of $f_1$, $12^{th}$ century with a relationship score of $f_2$, U.S. history with a relationship score of $f_3$, medieval history with a relationship score of $f_4$, etc.

A normalized relationship score refers to a normalization of a relationship score on a given scale, e.g., a scale of zero to one hundred. The normalized relationship scores are computed for each grouping of relationship scores, wherein the grouping is based on interest. In one embodiment, the normalized relationship scores are provided on a logarithmic scale, e.g., a base ten logarithm scale. Providing the normalized relationship scores on a logarithmic scale allows the range of normalized relationship scores to be narrower.

A sentinel relationship score refers to a relationship score that is set outside of a standard range of scores to indicate that a maximum possible normalized relationship score should be assigned instead of a normalized relationship score that is calculated. For example, if the standard range of scores is one to ten and a relationship score is set to a high number, e.g., 999999, the relationship score is said to be a sentinel relationship score. Then, when the normalization is performed to obtain normalized relationship scores, the maximum possible normalized relationship score is assigned to the relationship. For example, if the normalization is performed to use a scale of one to one hundred for all relationships, the normalized relationship score for a term to interest relationship to which a sentinel relationship score is assigned would be one hundred.

A resolved term refers to a term that is an output of the term discovery process. The output of the term discovery process provides a map of the resolved terms that represent a plurality of interests. The output of the term discovery process may be stored in a database of resolved terms, e.g., interest terms and topic terms, along with their normalized relationship scores. The database of resolved terms may be referred to as resolved terms database.

A seeded term refers to a term that has been manually entered to seed an algorithm for a term discovery process. A seeded term may be an interest, an inclusion, an equivalent term, an exclusion term, or a search helper term. Search helper terms and equivalent terms may be seeded terms or obtained from the term relationship database. The inclusion and exclusion terms are seeded terms.

An inclusion term refers to a term that is explicitly identified for inclusion in the term discovery process.

An exclusion term refers to a term that is explicitly identified for exclusion in the term discovery process.

An equivalent term refers to a term that is found to be a synonym of another term that is either seeded manually or identified in a term discovery process from an external database. For example, the external database may be a term relationship database.

An intermediate database refers to a database that stores one or more of:
 terms (both seeded terms and terms returned from a term relationship database);
 for each term returned from the term relationship database as a result of invoking an API to the term relationship database, a relationship score between the term returned from the term relationship database and the seeded term used for invoking the API; and
 a current hierarchy of terms being assembled, with interest being at the highest level of categorization.

An article refers to a unit of information. For example, an article may comprise one or more of: a video, a blog post, a forum entry, a white paper, a news story (or clip), an audio, an entry on a website, a book, a chapter in a book, a webpage, and so on.

An article discovery process refers to a process that identifies, ranks and indexes one or more articles using resolved terms, as defined above.

A search helper term refers to a term identified to hone a context for selecting an article in the article discovery process. The search helper term may be a manually seeded term or a term that is obtained from a term relationship database, e.g., via an API. In one example, search helper terms provide query formats that utilize a specific syntax of a learning information source and provide further context to the query. The learning information source is described below. In addition, the search helper terms may help narrow the query to a desired meaning of the term, an interest term or a topic term. For example, a query to a learning information source may be generated by combining a resolved term, retrieved from the resolved terms database, with one or more search helper terms, in order to ensure that the learning information source returns one or more extracted articles in context of the interest.

A search term refers to a term which is either a search helper term that is identified to hone a context for selecting an article or a resolved term which is an output of the term discovery process. For example, the article discovery process may generate search terms by combining the resolved terms with the search helper terms. The search terms that are generated may then be used to create a query that may be sent to a database that contains learning information sources.

A learning information source refers to a database that contains information to be extracted and used by the article discovery process in obtaining one or more articles. For example, the learning information source may comprise one or more of: videos, audio content, website, API, etc.

An extracted article refers to an article that is obtained from a learning information source. The Extracted articles are first stored in an extracted articles database, which is a database for storing each extracted article along with one or more search terms used to query the learning information source. If a particular article is extracted multiple times due to queries being issued using search terms that are related, the particular article may be stored, in duplicates, in the extracted articles database. For example, the same article may be stored as being related to different search terms. The duplicity indicates that the search terms used to issue the various queries are search terms that are related. The extracted articles that are stored in the extracted articles database are articles to be further evaluated, by the article discovery process, to determine whether or not they should be included in a database of articles, as described below.

An article to interest score refers to a score assigned to the article that quantifies a strength of a relationship between the article and the one or more search terms that were used to query the learning information source. The article to interest score is determined as a summation of normalized relationship scores, in the context of the interest, wherein the summation is over all search terms that are associated with the article. That is, the article to interest score is the sum of all of the normalized relationship scores for search terms that are related to a specific interest and are also related to the article that is extracted.

A normalized article to interest score refers to a score obtained by normalizing the article to interest scores over a highest possible normalized relationship score. The highest possible normalized relationship score refers to a sum of all the normalized relationship scores for search terms related to a specific interest.

A master article database refers to a database for storing a collection of articles that have been evaluated by the article discovery process for obtaining normalized article to interest scores, but not yet evaluated against goodness factors, described below. For each article in the master article database, the corresponding normalized article to interest score is also stored.

A goodness factor refers to a factor used as a secondary weight for an article that is based on characteristics of the article. For instance, the goodness factor may be based on the substance of an article, length of the article, feedback obtained from users about the article, words contained in a title of the article, the article being recommended by a user, etc. For example, if a video has introductory content for learning about a topic of interest, the article may have a high goodness factor when looking for content that is for learning about the topic of interest at an introductory level.

For each article that is stored in the master article database, one or more criteria for determining the goodness factor are retrieved. In one embodiment, the one or more criteria for the goodness factor may be seeded or retrieved from another server. Each of the one or more criteria is assigned a weight, e.g., a percentage. The article is then evaluated against each criterion to determine a value against the specific criterion. The sum of all the values is then computed for the article. For example, suppose there are two criteria, with a first criterion having a weight of 90% and the second criterion having a weight of 10%. Then, if an article has a score of 0.8 against the first criterion and a score of 1.0 against the second criteria, the value of the goodness factor for the article would be 0.82, which is computed as (0.9)(0.8)+(0.1)(1.0).

The database of articles is a database that contains the output of the article discovery process. For example, the database of articles may include articles that are extracted and are determined as being articles to be included in the database of articles, a normalized article to interest score for each article that is included, and a goodness factor.

Figure 2:
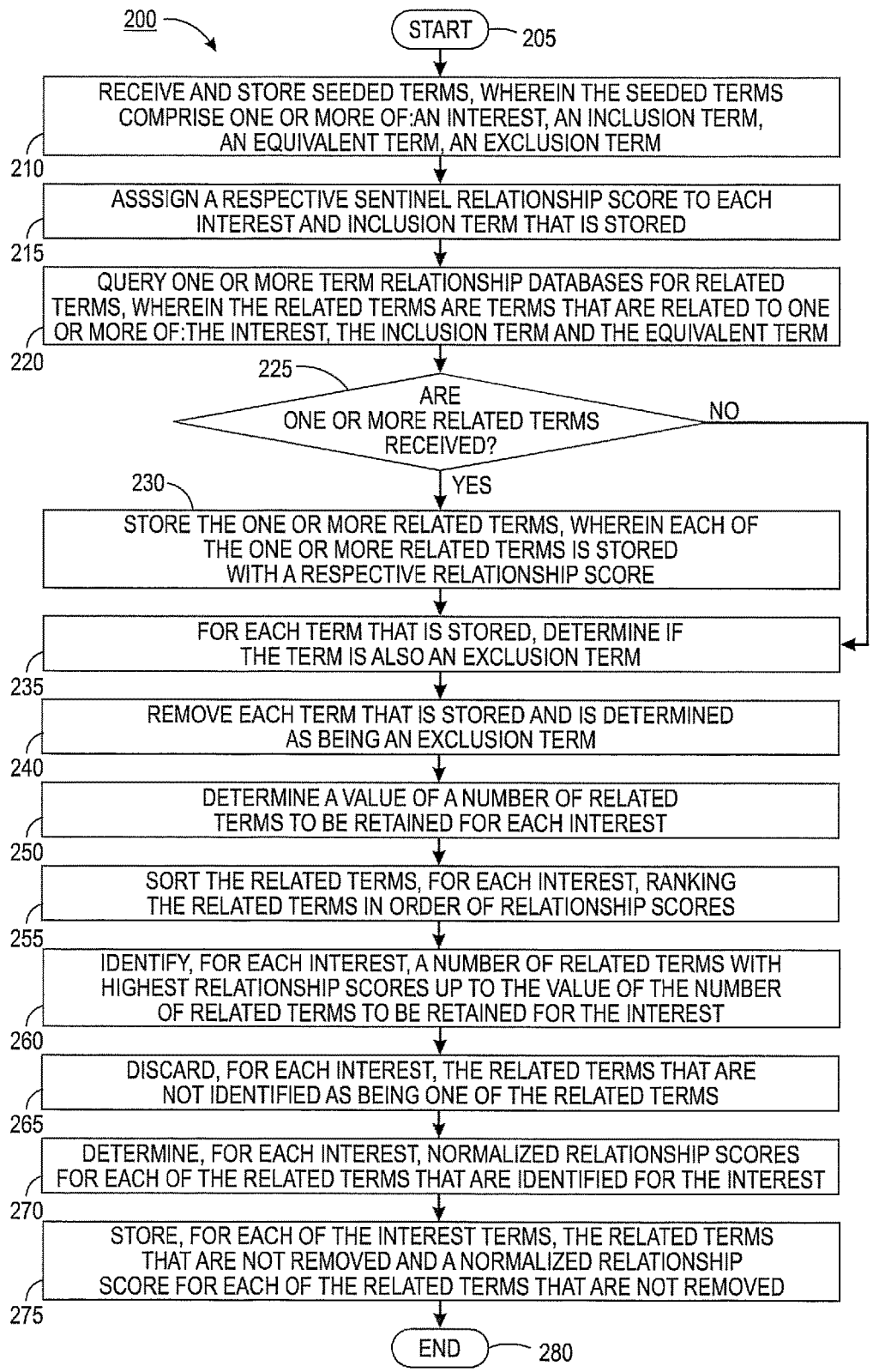
FIG. 2 illustrates an example flowchart of a method for performing the term discovery process in accordance with the present disclosure.

FIG. 2 illustrates an example flowchart of a method 200 for performing the term discovery process in accordance with the present disclosure. In one embodiment, the method 200 may be implemented in an application server, e.g., an application server 104, for performing the term discovery or the processor 802 as described in FIG. 8. The method 200 starts in step 205 and proceeds to step 210.

Figure 5A:
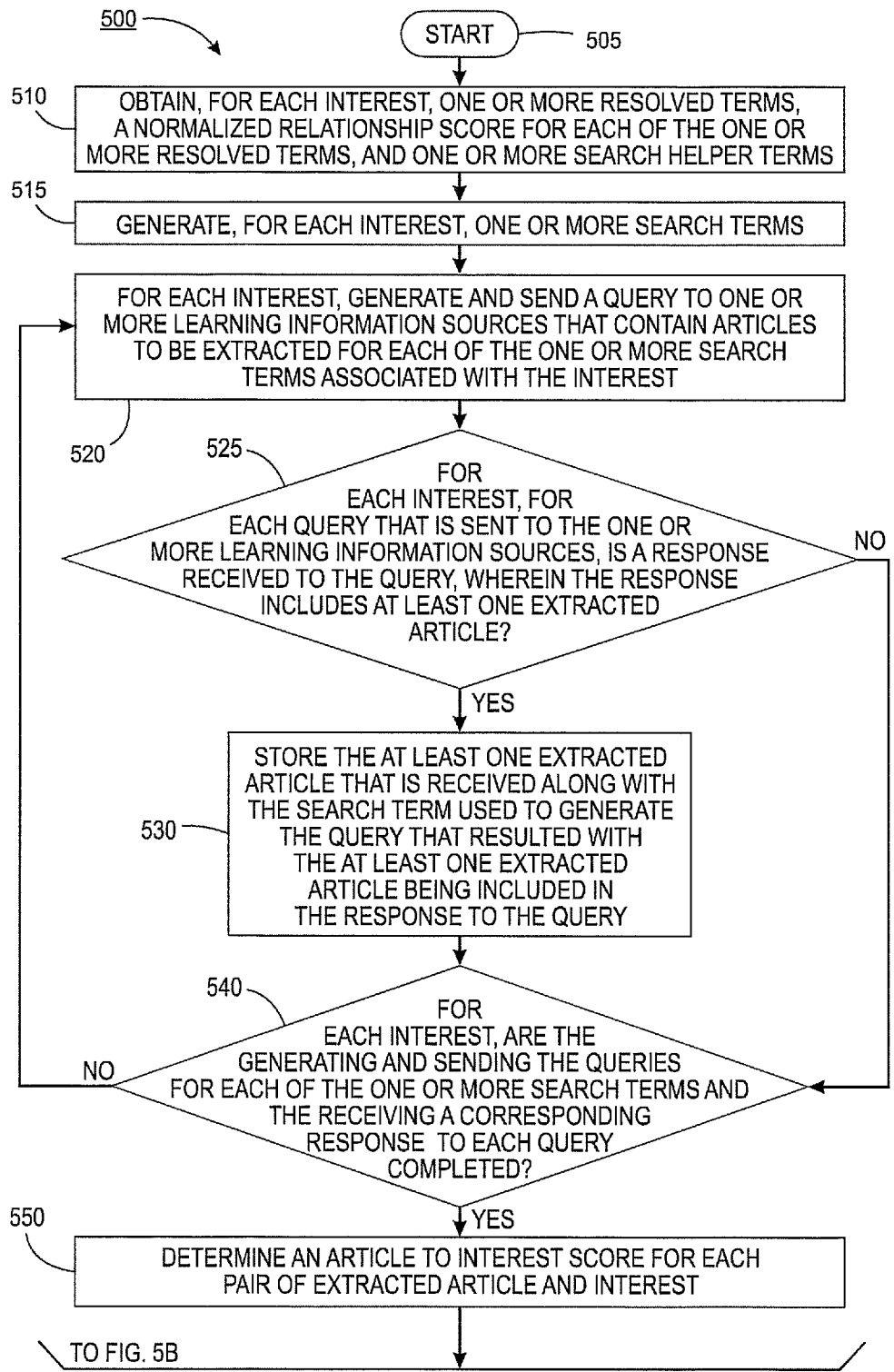
FIG. 5 (shown as FIG. 5A and FIG. 5B) illustrates an example flowchart of a method for performing the article discovery process in accordance with the present disclosure.
Figure 5B:
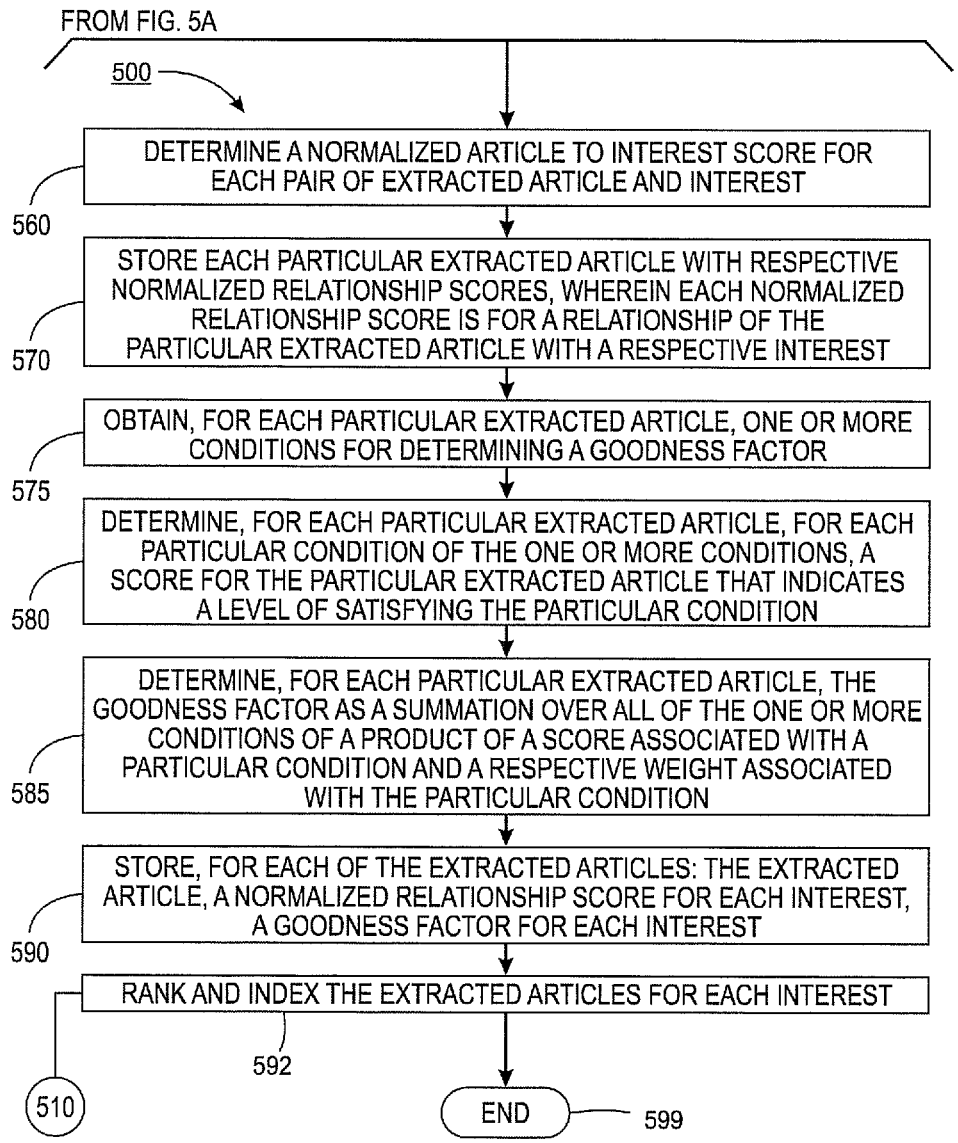

In step 210, the processor receives and stores seeded terms, wherein the seeded terms comprise one or more of: an interest, an inclusion term, an equivalent term, an exclusion term. In one embodiment, the seeded terms may also comprise one or more search helper term. In one embodiment, the seeded terms that are used in the term discovery process comprise one or more of: the interest, the inclusion term, the equivalent term, and the exclusion term. In one example, the search helper term may not be used during the term discovery process but may be seeded for used during the article discovery process, as illustrated in FIG. 5.

In one embodiment, the seeded terms that are received are stored in an intermediate database. For example, the database 105 of FIG. 1 may be implemented in accordance with the present disclosure to perform one or more functions of the intermediate database described above.

In step 215, the processor assigns a respective sentinel relationship score to each interest and inclusion term that is stored. For example, for each particular interest or inclusion term that is stored in the intermediate database, a respective sentinel relationship score that is set outside a standard range of scores is assigned. As noted above, the sentinel relationship score serves as a means to indicate that a maximum possible normalized relationship score should be assigned to the particular interest or inclusion term.

In step 220, the processor queries one or more term relationship databases for related terms, where the related terms are terms that are related to one or more of: the interest, the inclusion term and the equivalent term. For example, the equivalent terms that are seeded, the interest terms that are seeded, and the inclusion terms that are seeded, are used to invoke one or more external API (Application Programming Interface) to get the related terms, i.e., the one or more terms that are related to any number of the equivalent terms that are seeded, to any number of the interest terms that are seeded, and to any number of the inclusion terms that are seeded.

The one or more term relationship databases return the related terms. Each particular related term is returned along with a respective relationship score. For example, the relationship score for a particular related term may indicate a frequency in which the particular related term is found in relation to the seeded term used to invoke the external API. The related terms that are returned from the one or more term relationship databases are also stored in the intermediate database, with each related term being stored along with its respective relationship score.

In step 225, the processor determines if one or more related terms are received. If one or more related terms are received, the method proceeds to step 230. Otherwise, the method proceeds to step 235.

In step 230, the processor stores the one or more related terms, wherein each of the one or more related terms is stored with a respective relationship score. For example, the related terms and the relationship scores that are received from the one or more term relationship databases may be stored in the intermediate database. The method then proceeds to step 235.

In step 235, the processor determines, for each term that is stored, whether the term is also an exclusion term. For example, the method compares each term that is stored against a list of one or more exclusion terms. For instance, the terms that are stored in the intermediate database may comprise the interest, inclusion, equivalent, exclusion and related terms. However, as described above, the exclusion terms are terms used to hone the results to a pre-conceived definition of the interest. The list of exclusion terms is then used to identify which of the terms that are stored in the intermediate database should be removed from the intermediate database. For an illustrative example, if the interest is "API (Application Programming Interface)," and an equivalent term is "REST (Representational State Transfer)," a query may be issued to a term relationship database based on "REST." The query may return a related term "sleep," which does not have any relationship to APIs. The term "sleep" would then be in the list of exclusion terms.

In step 240, the processor removes each stored term that is determined as being an exclusion term. For example, each term that is in the intermediate database but is also identified as being in the list of the one or more exclusion terms is removed from the intermediate database (i.e., discarded). For the example above, the term "sleep" would be removed from the list of terms in the intermediate database.

The method then proceeds to normalize the relationship scores. However, the number of remaining terms in the database may be more than feasible for the purpose of searching for articles. For example, if the database contains one thousand terms related to a particular interest, it may not be practical or feasible to search for articles using all of the one thousand terms. In one example, the article discovery process may use a much smaller number of resolved terms, e.g., thirty resolved terms, for searching articles related to the particular interest. The normalization may then be performed over terms that will ultimately be stored as resolved terms and used in the next process, the article discovery process. For example, if the one thousand terms related to the particular interest are returned but only thirty may be stored for use in the next process, the method performs the normalization in view of the maximum number of resolved terms (e.g., thirty) that may eventually end up in the resolved terms database. Thus, the method first needs to determine a maximum number for a number of resolved terms that may be used by the article discovery process of the present disclosure. Then, the normalization of the term discovery process is performed in view of the maximum number of resolved terms to be used by the article discovery process.

In step 250, the processor determines a value of a number of related terms to be retained for each interest. In one embodiment, the value is configured by the service provider. For example, the service provider may configure a value (e.g., 30, 40, 50 terms and so on), to indicate how many related terms should be kept in the intermediate database for each interest.

In step 255, the processor, sorts the related terms, for each interest, ranking the related terms in order of relationship scores. For example, the related terms may be ranked in order from greatest relationship score to least relationship score. Since, the sentinel relationship scores are set to indicate a maximum possible normalized relationship score, the related terms that are the inclusion terms appear at the top of the ranked list, when ranked from greatest relationship score to least relationship score.

In step 260, the processor identifies, for each interest, a number of related terms with the highest relationship scores up to the value of the number of related terms to be retained for the interest. If there are additional related terms whose relationship scores are equivalent to that of the related term with the lowest relationship score that is identified, the additional related terms are also identified and retained. For example, suppose the value of the number of related terms to be kept (broadly a threshold) for each interest is thirty. Suppose also the related terms are rank ordered, from related terms with highest relationship score to related terms with the lowest relationship score. Then, if the relationship score of the related term ranked $30^{th}$ is equal to the relationship score of the related terms ranked $31^{st}$ and $32^{nd}$, then the terms that are ranked $31^{st}$ and $32^{nd}$ will be retained as well even though the threshold is set at 30. In other words, technically there are three distinct related terms that are all ranked $30^{th}$ given that all three related terms have the identical relationship score value. As such, the application of the threshold of 30 will not cause two of these equally ranked related terms to be dropped. Thus, in this illustrative example, the first 32 ranked related terms are identified and retained.

In step 265, the processor discards, for each interest, the related terms that are not identified as being one of the related terms. For the example above, the related terms ranked $33^{rd}$ or higher would be discarded.

In step 270, the processor determines, for each interest, normalized relationship scores for each of the related terms that are identified for the interest. For the example above, the normalized relationship scores are determined for each of the related terms that are identified for the interest, where the related terms are the terms ranked $1^{st}$ to $32^{nd}$.

In one embodiment, the normalized relationship scores are determined for the interest over a scale configured by the service provider. For example, the normalized relationship scores may be on a scale of zero to one, zero to a hundred, etc.

In one embodiment, the normalized relationship scores are determined using a maximum relationship score for the related terms that are identified for the interest, excluding the sentinel relationship scores. In one embodiment, the normalized relationship scores are provided using a logarithmic function and a scaling to fit over the scale that is configured by the service provider.

In one example, the method of the present disclosure determines the normalized relationship score, $rs_{norm}$, from the relationship score, rs, as shown in equation 1 and rounding to a whole number:

$$rs_{norm} = \begin{cases} 100 & \text{when } rs \text{ is sentinal} \\ 50 \times \log_{10} \frac{100 \times \text{relationship score}}{\text{maximum relationship score}} & \text{when } rs \text{ is not sentinal} \end{cases} \quad (1)$$

An example computation of the normalized relationship scores for an interest term "toy" is provided in Table-1. Suppose "doll" is provided as an inclusion term. Then, the term "doll" would have a relationship score outside the range of expected relationship scores, e.g., 999999. The term "doll" is then assigned the maximum normalized relationship score without the need for computation. For the related terms that are retrieved from a term relationship database, the related terms are retrieved along with their respective relationship scores as shown in Table-1. The maximum relationship score in the third column, other than the sentinel score is 5810. Thus, the maximum relationship score to be used in equation (1) is 5810. The normalized relationship scores, rounded to a whole number, are provided in the fourth column, as computed using equation (1).

TABLE 1

An example normalized relationship score.

| Interest | Related Term | Relationship Score | Normalized Relationship Score |
|---|---|---|---|
| Toy | Doll | 999999 | 100 |
| Toy | Building Block | 5810 | 100 |
| Toy | Board Game | 4150 | 93 |
| Toy | Ball | 1250 | 67 |
| Toy | Stick | 500 | 47 |

In step 275, the processor, for each of the interest terms, stores the related terms that are not removed, and stores a normalized relationship score for each of the related terms that are not removed. For example, the processor may store in a resolved terms database the related terms and corresponding normalized relationship scores. The method then proceeds to step 280 to end the current term discovery process or returns to step 210 to repeat the steps of method 200 for another interest.

Figure 3:
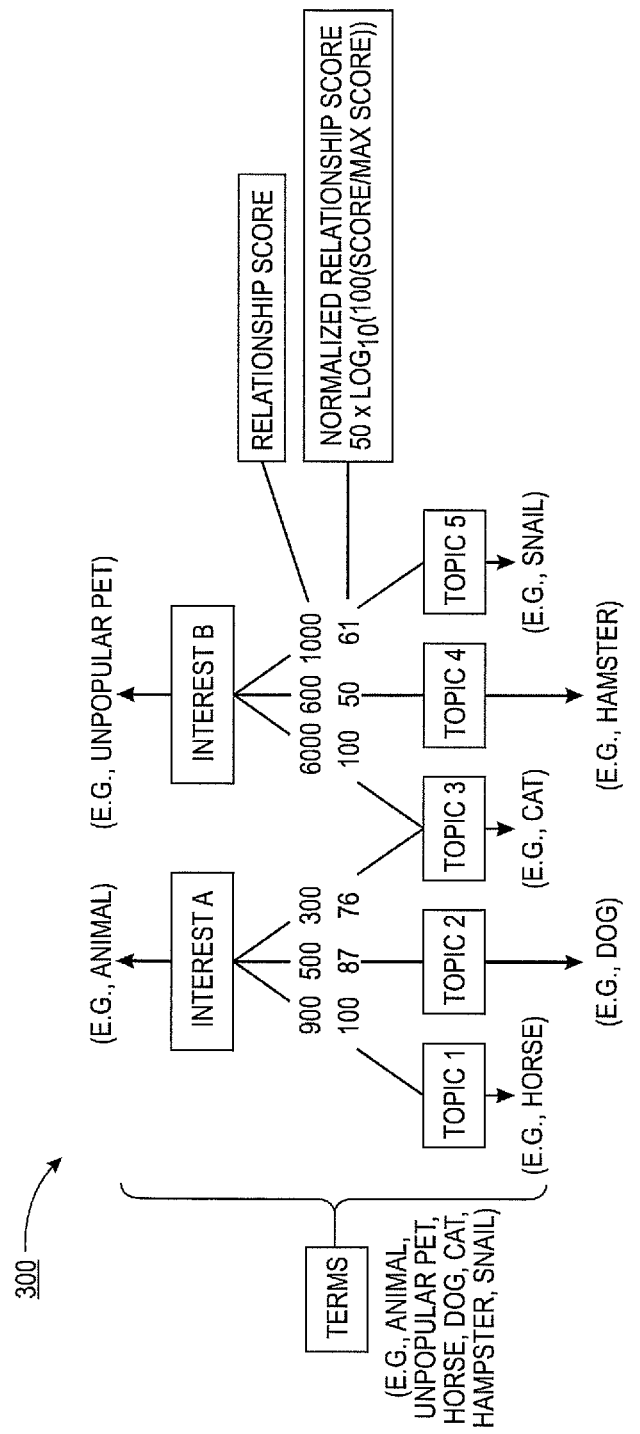
FIG. 3 illustrates an example graph of interests, terms, and topics with exemplary relationship scores and normalized relationship scores.

Once the normalized relationship scores are computed for all of the interests, a relationship graph may be drawn for the interests, terms and topics. To illustrate by way of example, FIG. 3 illustrates an example graph 300 of interests, terms, and topics with example relationship scores and normalized relationship scores. As defined above, interest is a curiosity at a highest level of categorization, a topic is related to one or more interests, and a term is a word or a set of words that can be used to represent both interests and topics. For the relationships of FIG. 3, suppose interest A is "animal," interest B is "unpopular pet," topic 1 is "horse," topic 2 is "dog," topic 3 is "cat," topic 4 is "hamster," and topic 5 is "snail." Then, the "terms" in FIG. 3 refer to a set of terms that include: animal, unpopular pet, horse, dog, cat, hamster and snail.

Figure 4:
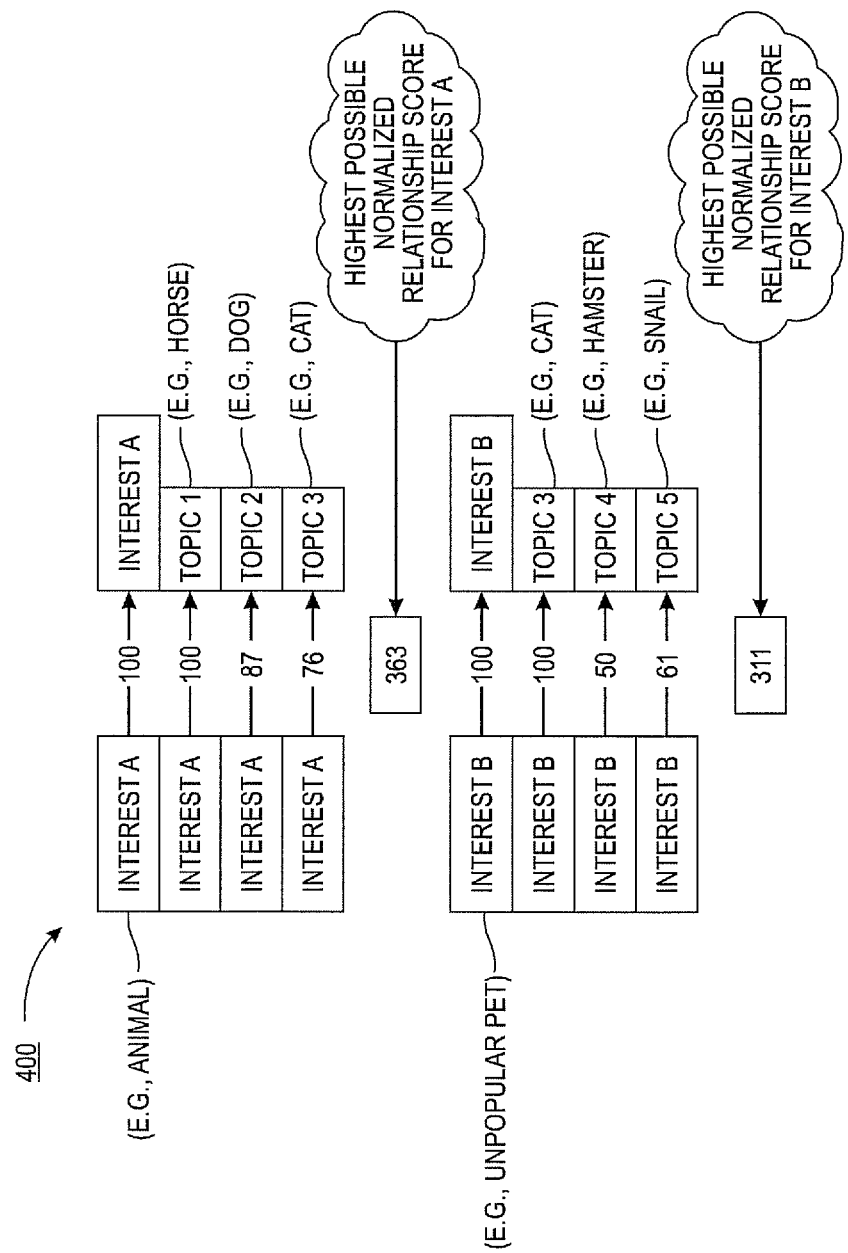
FIG. 4 illustrates an example output of the term discovery process.

FIG. 4 illustrates an example output 400 of the term discovery process. The output provides resolved terms and respective normalized relationship scores for each interest. For the example described above, if the value of the number of related terms to be retained for each interest is set to four, then the terms kept for interests A and B and their respective normalized relationship scores are as indicated in FIG. 4. For example, for interest A (animal), there are four terms retained which include: animal, horse, dog and cat. Similarly, for interest B (unpopular pet), there are four terms retained which include: unpopular pet, cat, hamster and snail.

The method then proceeds to the article discovery process. The article discovery process uses the resolved terms (output of the term discovery process) and normalized relationship scores that are determined and stored, as described above, along with search helper terms, which are terms identified to hone a context for selecting an article in the article discovery process.

FIG. 5 illustrates an example flowchart of a method 500 for performing the article discovery process in accordance with the present disclosure. In one embodiment, the method 500 may be implemented in an application server, e.g., an application server 104, for performing the article discovery process or the processor 802 as described in FIG. 8. The method 500 starts in step 505 and proceeds to step 510.

In step 510, the processor, obtains, for each interest, one or more resolved terms, a normalized relationship score for each of the one or more resolved terms, and zero or more search helper terms. The resolved terms for a particular interest include the related terms that are not removed (e.g., the terms that are stored in step 275 of the term discovery process).

In step 515, the processor, generates, for each interest, one or more search terms. In one embodiment, the article discovery process generates the one or more search terms by combining the one or more resolved terms with the zero or more search helper terms.

In step 520, the processor, generates and sends a query to one or more learning information sources that contain articles to be extracted, for each interest, i.e., for each of the one or more search terms associated with the interest. For example, the learning information sources may comprise sources for one or more of: videos, audio content, website, API, etc. For example, for interest A, if there are ten search terms generated and there are two learning information sources to which a query may be sent, the processor generates and sends twenty queries, ten queries directed to one learning information source and ten queries directed to the other learning information source.

In step 525, the processor, determines, for each interest, for each query that is sent to the one or more learning information sources, whether a response is received to the query, where the response includes at least one extracted article. When a response that includes the at least one extracted article is received, the method proceeds to step 530. Otherwise, the method proceeds to step 540. For the example above, the processor determines, for interest A, whether a response is received to each of the twenty queries that are sent. The tracking of responses to the various queries may be conducted in parallel.

In step 530, the processor stores the at least one extracted article that is received along with the search term used to generate the query that resulted with the at least one extracted article being included in the response to the query. For example, when an extracted article is received from a learning information source, the method stores the extracted article in an extracted articles database. Namely, the extracted articles database is a database for storing, for each interest, each of the one or more extracted articles along with respective one or more search terms, where the one or more search terms are the search terms used to generate the query that resulted with the one or more extracted articles being received.

For example, for an interest, if a particular article is extracted ten times due to ten queries being issued using ten different search terms, the particular article may be stored ten times in the extracted articles database. For instance, the same article may be extracted multiple times when the search terms are closely related.

In step 540, the processor determines, for each interest, whether the generating and sending of the queries for each of the one or more search terms and the receiving of a corresponding response to each sent query, are completed. If all queries are sent and corresponding responses are received for each search term for each learning information source for each interest, the method proceeds to step 550. Otherwise, the method proceeds to step 520 to continue sending queries, receiving extracted articles and storing the extracted articles (along with the respective search terms), as described in steps 520-530. In one embodiment, the steps 520, 525, 530 and 540 may be combined to a single step that generates and sends queries, tracks responses and determines when responses are received for all the queries that are sent.

In step 550, the processor determines an article to interest score for each pair of extracted article and interest. In one embodiment, the article to interest score is determined as a summation of normalized relationship scores, in a context of the interest, wherein the summation is over all terms that are associated with the article. For example, mathematically, for a particular article to a particular interest, the article to interest score may be the sum of all of the normalized relationship scores for search terms that are related to the particular interest and are also related to the particular article that is extracted. The article to interest score provides a metric to compare a strength of a relationship between the article for which the article to interest score is being determined and the one or more search terms that were used to query the learning information sources.

For the illustrative examples described in FIG. 3 and FIG. 4, suppose Article X is extracted for search terms horse (topic 1), cat (topic 3), snail (topic 5), and (unpopular pets (interest B). FIG. 4 shows, for interest B, the search terms with the four highest normalized relationship scores comprise: interest B and topics 3, 4 and 5. Similarly, for interest A, the search terms with the four highest normalized relationship scores comprise: interest A and topics 1, 2 and 3.

Then, the article X to interest B score may be computed as the sum of the normalized relationship scores of interest B to interest B (e.g., 100), interest B to topic 3 (e.g., 100), and interest B to topic 5 (e.g., 61). Thus, the article X to interest B score is equal to 261. Similarly, the article X to interest A score may be computed as the sum of the normalized relationship scores of interest A to topic 1 (e.g., 100), and interest A to topic 3 (e.g., 76). Thus, the article X to interest A score is equal to 176.

Note that a query for articles based on the search term "topic 4" did not result with the Article X being extracted. Therefore, the normalized relationship score between interest B and topic 4 (e.g., 50) is not included in the article X to interest B score. Similarly, the queries for articles based on the search terms "interest A" and "topic 2" did not result with the Article X being extracted. Therefore, the normalized relationship score between "interest A" and "interest A" (e.g., 100) and the normalized relationship score between "interest A" and "topic 2" (e.g., 87) are not included in the article X to interest A score.

In step 560, the processor determines a normalized article to interest score for each pair of extracted article and interest. In one embodiment, the method determines the normalized article to interest score, by performing a normalizing function on the article to interest scores determined in step 550 based on the highest possible normalized relationship score for terms in the resolved terms database that are related to the interest, and then rounding the results to a whole number.

For the example illustrated above, the highest possible normalized relationship scores for interests A and B may be obtained by summing the normalized relationship scores for the respective related terms. For example, the highest possible normalized relationship score for interest A is obtained as being equal to 363, which may be computed by adding normalized relationship scores for its four terms (animal (interest A), horse (topic 1), dog (topic 2), and cat (topic 3)) that are retained for interest A (animal). Similarly, the highest possible normalized relationship score for interest B is obtained as being equal to 311, which may be computed by adding normalized relationship scores for its four terms (unpopular pets (interest B), cat (topic 3), hamster (topic 4), and snail (topic 5)).

Then, the normalized article to interest score may be computed by rounding to a whole number: The $$\text{normalized article to interest score}_{before\ rounding} = \frac{100 \times \text{article to interest score}}{\text{highest possible relationship score}}. \quad (2)$$

Then, the normalized relationship score for article X to interest A is equal to 48, which is derived by rounding to a whole number 100×(100+76)/363. Similarly, the normalized relationship score for article X to interest B is equal to 84, which is derived by rounding to a whole number 100×(100+61+100)/311. FIG. 6 illustrates an example normalized article to interest relationship score 600, as described above.

In step 570, the processor stores each particular extracted article with respective normalized relationship scores, wherein each normalized relationship score is for a relationship of the particular extracted article with a respective interest. For example, in a master article database, the article X may be stored along with its normalized relationship scores for interest A and interest B. The respective normalized relationship scores signify the relevance of particular article to the particular interest, e.g., interest A or interest B.

In step 575, the processor obtains, for each particular extracted article, one or more conditions for determining a goodness factor. For example, the goodness factor may be based on several conditions related to substance of the article, length of the extracted article, feedback obtained from users about the extracted article, words contained in a title of the extracted article, and so on. In one embodiment, each of the one or more conditions for the goodness factor for the extracted article may be obtained with a respective weight for evaluating the condition against the remaining conditions. An example list of conditions for goodness factor with respective weights is shown in Table-2.

TABLE 2

Example conditions for goodness factor and weights.

| | |
|---|---|
| The extracted article title contains 'beginner words' such as: beginner, intro, getting started, easy, straight forward, obvious, learning, clear, introduction, good, great, tutorial, fundamental, walk through, high level or explain | .20 |
| The title contains one or more of the terms it was associated with in the extracted article database. | .10 |
| The length of the description retrieved with the extracted article is larger than 14 characters. | .05 |
| The extracted article is a forum post or video. | .05 |

TABLE 2-continued

Example conditions for goodness factor and weights.

| | |
|---|---|
| The extracted article comes from a learning information source that has been manually identified as "hand-picked" | .20 |
| The extracted article description contains one or more of the terms it was associated with in the extracted articles database. | .05 |
| The extracted article is associated with more than one term. A higher value is assigned if the count of related terms is >7, and higher yet if the count of related terms is >14. | .05 |
| The extracted article description contains 'beginner words' as noted above. | .10 |
| The extracted article's ID has been identified as "sponsored", meaning chosen as important via manual processes. | .20 |

In step 580, the processor determines, for each particular extracted article, for each particular condition of the one or more conditions, a score for the particular extracted article that indicates a level of satisfying the particular condition. For example, if the article satisfies the first condition in Table-2 completely, a score of 1 may be assigned. In contrast, if the condition is half satisfied, the score may be 0.5.

In step 585, the processor determines, for each particular extracted article, the goodness factor as a summation over all of the one or more conditions of a product of a score associated with a particular condition and a respective weight associated with the particular condition. For example, if the article satisfied all the conditions above completely, the goodness factor is one. If the article satisfied the first condition completely (score of one) but failed to satisfy all the other conditions (scores of zero), the goodness factor would be 0.2, which is derived as: 0.2(1)+0.1(0)+0.05(0)+0.05(0)+0.2(0)+0.05(0)+0.05(0)+0.1(0)+0.2(0).

In step 590, the processor stores, for each of the extracted articles: the extracted article, a normalized relationship score for each interest, a goodness factor for each interest. The articles, and their respective normalized relationship scores with respect to various interests, as well as the goodness factors may be stored in a database of articles to be searched for learning about the various interests.

In step 592, the processor, ranks and indexes the extracted articles for each interest. The method then proceeds either to step 599 to end the current article discovery process or returns to step 510 to repeat the method 500 again for another interest. For example, the ranking and indexing may be performed such that the extracted articles are retrieved in a desired order when a query is received from a user for a recommendation for learning. For example, the one or more extracted articles that are related to the interest of the user are ordered and indexed such that an extracted article of the one or more extracted articles with a higher ranking is presented before an extracted article of the one or more articles with a lower ranking. In practice, if an article is indexed for various interests, the article would have different rankings for the various interests. In other words, the various rankings of the article are based on the relevance of the article to the various interests.

In one embodiment, the extracted articles are first ordered based on their normalized relationship scores with respect to an interest and then based on their goodness factors. That is, the primary criterion for ranking is the normalized relationship score and the secondary criterion is the goodness factor.

In one embodiment, the extracted articles that are ordered on the basis of their normalized relationship scores are further categorized into a plurality of categories. For example, rather than comparing the exact normalized relationship scores, categories may be established based on ranges of normalized relationship scores. In one embodiment, extracted articles that are within a same category are then further ordered based on their respective goodness factors. In one embodiment, the number of categories may be set by the service provider.

For example, suppose for interest A, described above, several articles, e.g., 20, are retrieved. Suppose the service provider configures five categories based on normalized relationship scores, e.g., a first category for normalized scores of 1-10, a second category for normalized scores of 11-20, a third category for normalized scores of 21-60, a fourth category for normalized scores of 61-90, and a fifth category for normalized scores of 91-100. Each of the 20 articles would then be categorized as being in one of the five categories. For example, Article X, which had a normalized score of 48, may be in the third category. If there are multiple articles within the same category, the secondary factor (i.e., the goodness factor) is used to order the articles within the same category.

Figure 7:
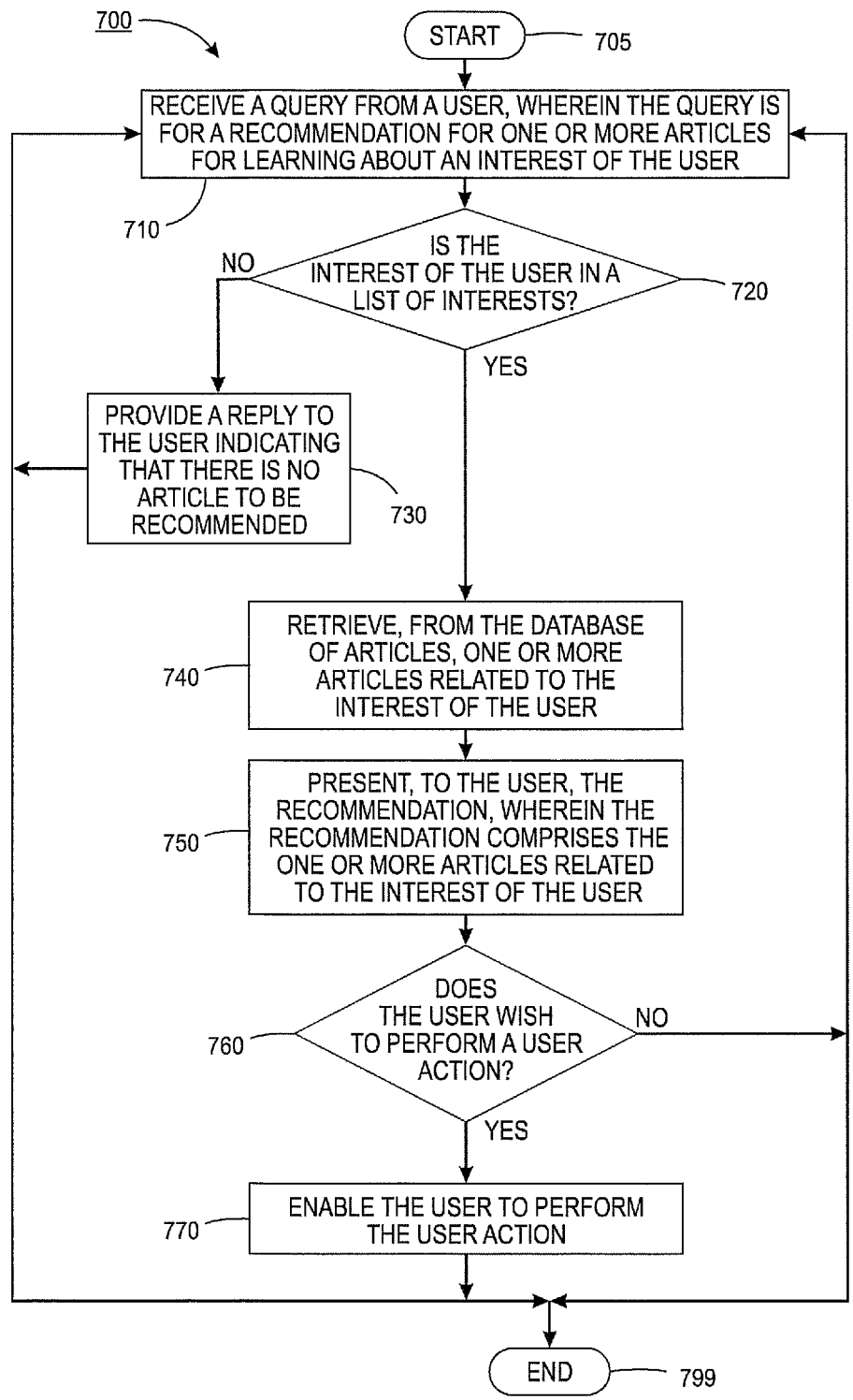
FIG. 7 illustrates an example flowchart of a method 700 for providing a recommendation for learning about an interest of a user in accordance with the present disclosure.

FIG. 7 illustrates an example flowchart of a method 700 for providing a recommendation for learning about an interest of a user in accordance with the present disclosure. In one embodiment, the method 700 may be implemented in an application server, e.g., an application server 104, for providing the recommendation or the processor 802 as described in FIG. 8. The method 700 starts in step 705 and proceeds to step 710.

In step 710, the processor receives a query from an endpoint device of a user, wherein the query is for a recommendation for one or more articles for learning about an interest of the user. For example, the user may select a subject matter about which he/she is interested in learning. In one embodiment, the interest may be received in a form of a selection from a list of interests for which the service provider has collected articles and indexed, e.g., in accordance with method 500 of the present disclosure.

In step 720, the processor determines whether the interest of the user is in a list of interests, wherein each particular interest in the list of interests is an interest for which a database of articles contains at least one article for learning about the particular interest. If the interest of the user is not in the list of interests, the method proceeds to step 730. Otherwise, the method proceeds to step 740.

The database of articles is a database used for storing for each particular article of the one or more articles in the database: the particular article, a normalized relationship score for the particular article for each interest in the list of interests, and a goodness factor for the particular article for each interest in the list of interests. Each particular article of the one or more articles that is stored in the database of articles is extracted and stored in the database. Namely, the present disclosure does not simply provide a link to another location where the article may be found. Instead, a summary of information about the article (e.g., a title, author, brief description, and temporal information (e.g., publication date, and/or copyright date) including a link to the article) is extracted and stored in the database of articles. The article may then be ranked and indexed, with respect to each specific interest, based on a normalized relationship score. In one embodiment, the ranking and indexing is further based on a goodness factor for the specific interest. In one embodiment, as described in FIG. 5, the ranking of the article for a specific interest may be based on the articles first being ordered based on their normalized relationship scores with respect to the specific interest (as a first criteria), and then the articles with normalized relationship scores that are either identical or close (i.e., in a same category as described above) being ordered based on their goodness factor with respect to the specific interest (as a second criteria).

In step 730, the processor provides a reply to the user indicating that there is no article to be recommended. The method then either returns to step 710 or proceeds to step 799.

In step 740, the processor retrieves, from the database of articles, one or more articles related to the interest of the user, e.g., a summary of information about the article (e.g., a title, author, brief description, and temporal information (e.g., publication date, and/or copyright date) including a link to the article) or a soft copy of the article, e.g., a Portable Document Format (PDF) formatted copy of the article or any other document formats.

In step 750, the processor presents, to the endpoint device of the user, the recommendation, wherein the recommendation comprises the one or more articles related to the interest of the user. In one embodiment, the one or more articles related to the interest of the user are presented in an order with an article of the one or more articles with a higher ranking being presented before an article of the one or more articles with a lower ranking. For example, the processor may present the one or more articles, wherein the one or more articles related to the interest of the user are presented with an article of the one or more articles related to the interest of the user with a highest ranking being presented first, followed by an article related to the interest of the user with a $2^{nd}$ highest ranking, followed by an article related to the interest of the user with a $3^{rd}$ highest ranking, etc., until all of the one or more articles that are related to the interest of the user are presented.

In optional step 760, the processor determines whether the user wishes to perform a user action. If the user wishes to perform one or more user actions, the method proceeds to step 770. Otherwise, the method proceeds either to step 710 or step 799. In one embodiment, the user action comprises one or more of: provide feedback, share with a friend, share with a group of individuals (e.g., a study group, a work group, or a class of students), and recommend another article.

In optional step 770, the processor enables the user to perform the user action. The method then proceeds either to step 710, or to step 799 to end the process.

In one example, the user action may be to provide feedback on usefulness of anyone of the one or more articles for learning about the interest of the user. For example, the method may enable the user to provide feedback on one or more articles that were previously presented. For instance, the method may enable the user to vote or indicate a degree of liking the article or disliking the article. In one embodiment, the feedback may be used for selecting articles to be delivered to the user and/or other users in a response to another query for a recommendation, e.g., a query received in a future time frame. For example, the feedback from a currently delivered or recommended articles may be used for selecting an article for a next delivery of recommended articles.

In one embodiment, the user action may be to create a study group for learning about the interest of the user. In one embodiment, the user action may be to join an existing study group for learning about the interest of the user. In one embodiment, members of the study group may share notes and articles that they have found to be useful for learning about the interest of the user.

In one embodiment, the method may enable the user to search for other users with a same and/or similar interest.

For instance, peers with similar interests may be grouped together to allow the user to reach out to other users with similar interests.

In one example, the user action may be to recommend an article that is not in a current list of the articles in the article database. The method may enable the user to contribute an article for review by other users with similar interest. For example, the method may enable the user to submit articles that are to be considered for inclusion in the future. The article may then be presented to others as an unrated article, e.g., as a candidate article. If other users like the article and rate the article as being useful for the learning application, the article may then be stored and/or distributed in response to future queries.

In one embodiment, the method may provide the recommendation of one or more articles related to the interest of the user on a recurring basis. For the example above, the user may wish to learn new techniques and/or designs for making vases. In one embodiment, the user determines a time interval for providing the recommendation on the recurring basis. For example, the user may wish to get new articles on a daily, weekly, monthly, quarterly, or yearly basis.

In one example, the present method for providing a recommendation for learning about an interest to a user of the present disclosure is implemented via a dedicated database server. Furthermore, in one embodiment, the present method for providing a recommendation for learning about an interest can be provided in the dedicated database server, e.g., AS 104, operated and managed by a network service provider. For example, the network service provider may operate one or more networks to provide one or more services such as telephony services, cellular services, data services (e.g., data access and transfer services, Internet access services, and the like), multimedia delivery services (e.g., multimedia programming delivery services such as movies, videos, music and the like), and the like.

As such, the present disclosure provides at least one advancement in the technical field of providing a recommendation of articles to a user for learning about an interest of the user. This advancement improves delivery of articles to the user for a learning application, from a database that ranks and stores articles based on their relevance to a learning application, rather than a commercial purpose or an advertising placement.

FIG. 8 depicts a high-level block diagram of a computer suitable for use in performing the functions described herein. As depicted in FIG. 8, the system 800 comprises one or more hardware processor elements 802 (e.g., a central processing unit (CPU), a microprocessor, or a multi-core processor), a memory 804, e.g., random access memory (RAM) and/or read only memory (ROM), a module 805 for providing a recommendation for learning about an interest of a user, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the methods 200, 500 and/or 700 as discussed above is implemented in a distributed or parallel manner for a particular illustrative example, i.e., the steps of the above methods 200, 500 and/or 700, or each of the entire methods 200, 500 and/or 700 are implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 805 for providing a recommendation for learning about an interest of a user (e.g., a software program comprising computer-executable instructions) can be loaded into memory 804 and executed by hardware processor element 802 to implement the steps, functions or operations as discussed above in connection with the illustrative methods 200, 500 and/or 700. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 805 for providing a recommendation for learning about an interest of a user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
   receiving, via a processor, a query from a user, wherein the query is for a recommendation for learning about an interest of the user;
   determining, via the processor, whether the interest of the user is in a list of interests, wherein each particular interest in the list of interests is an interest for which a database of articles contains at least one article for learning about the particular interest, wherein the database of articles is a database storing for each particular article of the articles in the database: the particular article and a normalized relationship score for the particular article to the interest, wherein the normalized relationship score refers to a normalization of an article-to-interest score on a scale, wherein the article-to-interest score is a score for quantifying a strength of relationship between the interest and the particular article, wherein the article-to-interest score is calculated based upon a sum of normalized relationship scores of terms associated with the particular article to the interest;

retrieving, via the processor, from the database of articles, one or more articles having normalized relationship scores related to the interest in the query for the recommendation about the interest, when the interest is in the list of interests; and presenting, via the processor, the recommendation to an endpoint device of the user, wherein the recommendation comprises a summary of information about the one or more articles related to the interest that are retrieved, wherein the summary of information about the one or more articles comprises:
  bibliographical information for the one or more articles; and
    a respective link to the one or more articles, or
    a respective soft copy of the one or more articles.

2. The method of claim 1, further comprising:
enabling, via the processor, the user to perform a user action.

3. The method of claim 2, wherein the user action comprises providing a feedback pertaining to the recommendation.

4. The method of claim 2, wherein the user action comprises sharing with a friend.

5. The method of claim 2, wherein the user action comprises sharing with a group of individuals.

6. The method of claim 2, wherein the user action comprises recommending another article related to the interest that is not in the database.

7. The method of claim 1, wherein the presenting the recommendation that comprises the summary of information about the one or more articles related to the interest is performed in accordance with a rank for the each particular article of the one or more articles that is based on the normalized relationship score, with an article of the one or more articles with a higher rank being presented before an article of the one or more articles with a lower rank.

8. The method of claim 7, wherein the rank of the each particular article of the one or more articles is further based on a goodness factor of the particular article for the interest.

9. The method of claim 8, wherein the rank of the each particular article of the one or more articles is further determined by:
  establishing a plurality of categories based on a range of normalized relationship scores;
  categorizing the each particular article of the one or more articles as a member of one of the plurality of categories that are established; and
  ordering, for each of the plurality of categories, ones of the one or more articles that are within a same category based on respective goodness factors associated with the ones of the one or more articles that are within the same category.

10. The method of claim 9, wherein a service provider determines a number of categories that is established.

11. The method of claim 1, wherein the presenting the recommendation is performed on a recurring basis.

12. The method of claim 11, wherein a time interval for the recurring basis is set by the user.

13. A non-transitory computer-readable storage device storing a plurality of instructions which, when executed by a processor, cause the processor to perform operations, the operations comprising:
  receiving a query from a user, wherein the query is for a recommendation for learning about an interest of the user;
  determining whether the interest of the user is in a list of interests, wherein each particular interest in the list of interests is an interest for which a database of articles contains at least one article for learning about the particular interest, wherein the database of articles is a database storing for each particular article of the articles in the database: the particular article and a normalized relationship score for the particular article to the interest, wherein the normalized relationship score refers to a normalization of an article-to-interest score on a scale, wherein the article-to-interest score is a score for quantifying a strength of relationship between the interest and the particular article, wherein the article-to-interest score is calculated based upon a sum of normalized relationship scores of terms associated with the particular article to the interest;
  retrieving, from the database of articles, one or more articles having normalized relationship scores related to the interest in the query for the recommendation about the interest, when the interest is in the list of interests; and
  presenting the recommendation to an endpoint device of the user, wherein the recommendation comprises a summary of information about the one or more articles related to the interest that are retrieved, wherein the summary of information about the one or more articles comprises:
    bibliographical information for the one or more articles; and
      a respective link to the one or more articles, or
      a respective soft copy of the one or more articles.

14. The non-transitory computer-readable storage device of claim 13, further comprising:
enabling the user to perform a user action.

15. The non-transitory computer-readable storage device of claim 14, wherein the user action comprises at least one of: providing a feedback pertaining to the recommendation, sharing with a friend, sharing with a group of individuals, and recommending another article related to the interest that is not in the database.

16. The non-transitory computer-readable storage device of claim 13, wherein the presenting the recommendation that comprises the summary of information about the one or more articles related to the interest is performed in accordance with a rank for the each particular article of the one or more articles that is based on the normalized relationship score, with an article of the one or more articles with a higher rank being presented before an article of the one or more articles with a lower rank.

17. The non-transitory computer-readable storage device of claim 16, wherein the rank of the each particular article of the one or more articles is further based on a goodness factor of the particular article for the interest.

18. The non-transitory computer-readable storage device of claim 17, wherein the rank of the each particular article of the one or more articles is further determined by:

establishing a plurality of categories based on a range of normalized relationship scores;

categorizing the each particular article of the one or more articles as a member of one of the plurality of categories that are established; and ordering, for each of the plurality of categories, ones of the one or more articles that are within a same category based on respective goodness factors associated with the ones of the one or more articles that are within the same category.

19. The non-transitory computer-readable storage device of claim 18, wherein the presenting the recommendation is performed on a recurring basis.

20. An apparatus comprising:

a processor; and a computer-readable storage device storing a plurality of instructions which, when executed by the processor, cause the processor to perform operations, the operations comprising:

receiving a query from a user, wherein the query is for a recommendation for learning about an interest of the user;

determining whether the interest of the user is in a list of interests, wherein each particular interest in the list of interests is an interest for which a database of articles contains at least one article for learning about the particular interest, wherein the database of articles is a database storing for each particular article of the articles in the database: the particular article and a normalized relationship score for the particular article to the interest, wherein the normalized relationship score refers to a normalization of an article-to-interest score on a scale, wherein the article-to-interest score is a score for quantifying a strength of relationship between the interest and the particular article, wherein the article-to-interest score is calculated based upon a sum of normalized relationship scores of terms associated with the particular article to the interest;

retrieving, from the database of articles, one or more articles having normalized relationship scores related to the interest in the query for the recommendation about the interest, when the interest is in the list of interests; and presenting the recommendation to an endpoint device of the user, wherein the recommendation comprises a summary of information about the one or more articles related to the interest that are retrieved, wherein the summary of information about the one or more articles comprises:

bibliographical information for the one or more articles; and a respective link to the one or more articles, or a respective soft copy of the one or more articles.

* * * * *